United States Patent [19]

Yamasaki et al.

[11] Patent Number: 4,851,925
[45] Date of Patent: Jul. 25, 1989

[54] ELECTRONIC IMAGE TRANSFER DEVICE AND A FILM USED THEREIN

[75] Inventors: Kimihito Yamasaki; Shunju Anzai, both of Nara, Japan

[73] Assignee: Sharp Kabushiki Kaisha, Osaka, Japan

[21] Appl. No.: 306,242

[22] Filed: Feb. 2, 1989

Related U.S. Application Data

[63] Continuation of Ser. No. 929,392, Nov. 10, 1986, abandoned, which is a continuation of Ser. No. 169,099, Mar. 8, 1988, abandoned.

[30] Foreign Application Priority Data

Nov. 12, 1985 [JP] Japan .................. 60-255701
Nov. 12, 1985 [JP] Japan .................. 60-255702
Nov. 12, 1985 [JP] Japan .................. 60-255703

[51] Int. Cl.$^4$ .......................................... H04N 1/04
[52] U.S. Cl. ................................. 358/296; 358/474
[58] Field of Search .............. 358/296, 285, 286; 346/76 PH

[56] References Cited

U.S. PATENT DOCUMENTS

| | | | |
|---|---|---|---|
| 4,319,283 | 3/1982 | Ozawa et al. | 358/286 |
| 4,347,533 | 8/1982 | Ogawa | 358/296 |
| 4,407,002 | 9/1983 | Inui et al. | 346/76 PH |
| 4,476,496 | 10/1984 | Thaler | 358/296 |
| 4,574,317 | 3/1986 | Scheible | 358/296 |

Primary Examiner—Clifford C. Shaw
Attorney, Agent, or Firm—Flehr, Hohbach, Test, Albritton & Herbert

[57] ABSTRACT

A compact electronic image transfer device includes an image sensor which scans an original image to form image signals, a memory which accumulates and stores these image signals, a printer which scans a printing medium and prints an output image on this medium according to the image signals stored in the memory, and a driving device for causing the image sensor and the printer to move within a same plane. Use is made of a thermal transfer donor film with transparent areas and donor areas formed alternately along its length. A donor area with a coating of donor material is used when the printer prints an image. A transparent area is used when the image sensor scans an original document.

8 Claims, 5 Drawing Sheets

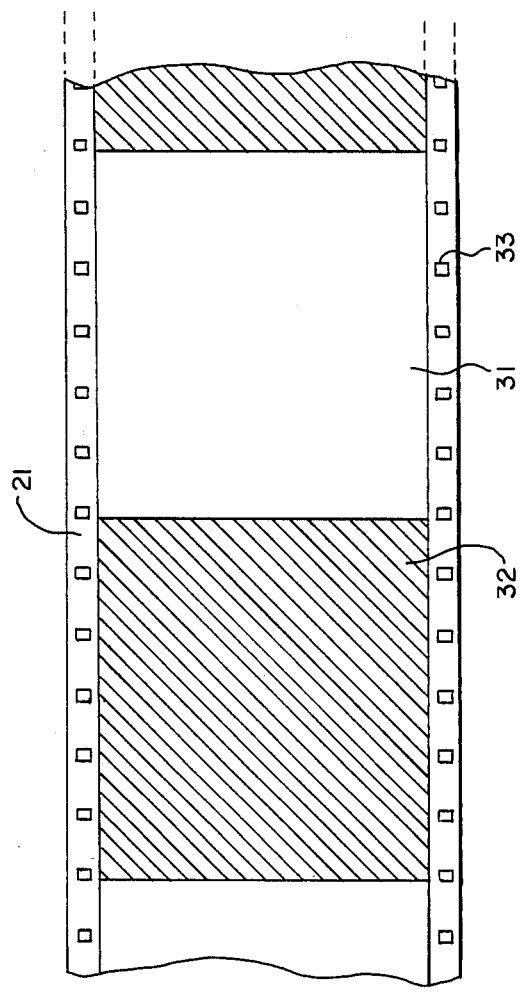
FIG.—5A
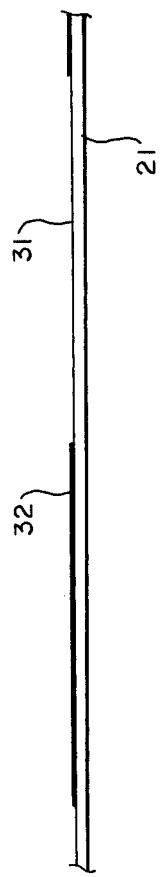
FIG.—5B

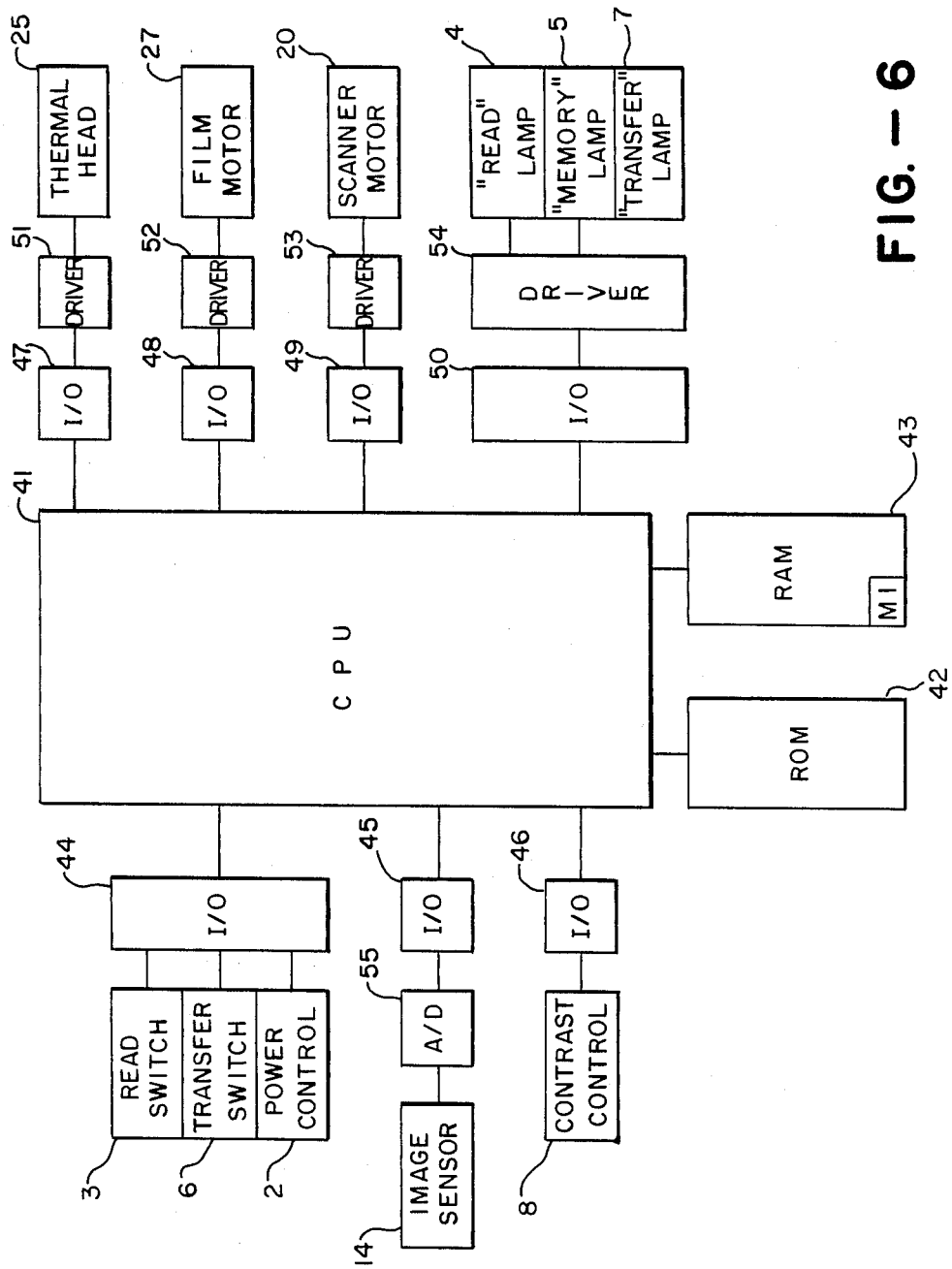
FIG.—6

ELECTRONIC IMAGE TRANSFER DEVICE AND A FILM USED THEREIN

This is a continuation of application Ser. No. 929,392 filed Nov. 10, 1986, abandoned, which is a continuation of application Ser. No. 169,099 filed Mar. 8, 1988, now abandoned.

BACKGROUND OF THE INVENTION

This invention relates to an electronic image transfer device which stores image signals formed by an image sensor and prints on a medium an image represented by the stored signals and a thermal transfer donor film used therein. More particularly, an electronic image transfer device of the present invention is of a compact, portable type, having an image sensor and an image printer which are designed to scan within a single plane such that the image detected on an original by the image sensor and stored as image signals is printed by the printer on any medium, thereby obviating the need to store specially processed copy paper in its interior. The thermal transfer donor film of the present invention for use in such an electronic image transfer device has transparent and donor areas alternately such that the image sensor and the printer can be operated to scan within a single plane.

Since copiers and transfer devices are used nowadays for different purposes and under varied conditions, it is desired to provide compact, hand-held models of these devices. Conventionally, however, such devices make use of a heat-sensitive method and a image cannot be printed unless use is made of specially processed heat-sensitive recording paper. For this reason, a roll of such processed paper is usually contained inside the device and this has the disadvantage of complicating the maintenance operation. Moreover, printed paper is discharged continuously from such a device and the work of cutting it into desired sizes or combining them together can be extremely troublesome.

With the so-called plane paper copiers (PPC), specially treated paper is not required and the basic process is not different from the conventional method. In other words, a latent image of an original document is formed on a photosensitive body and after a toner image is electrostatically formed, it is transferred to a copying medium such as paper. In order to carry out this series of processes, however, the device must include a document table which serves as input surface, a photosensitive body on which an image is formed electrostatically, and a transfer device for transferring a toner image onto the copying medium. These requirements make it extremely difficult to design a compact device. Although attempts have been made to develop a device comprising an image sensor for detecting an image on an original document and a printer for printing the image detected by the image sensor, thereby obviating the need for a photosensitive body, the image sensor and the printer have usually been disposed one-dimensionally in order to reduce cost. As a result, a plurality of driving means are required to operate these components and this again prevents reduction of the overall size of the device.

SUMMARY OF THE INVENTION

It is therefore an object of the present invention to provide a compact electronic image transfer device of hand-held type by which an image can be printed on any medium so that there is no need to use and specially processed paper.

It is a further object of the present invention to provide a compact electronic image transfer device which uses a single driving means to operate both an image sensor for detecting an image and a printer for printing an image detected by this image sensor.

It is still another object of the present invention to provide a thermal transfer donor film by means of which an image sensor as input means and a printer as output means of such an electronic image transfer device can be disposed on a same plane.

The above and other objects of the present invention are achieved by providing an electronic image transfer device characterized as having an image sensor which scans an original document and forms image signals, a memory device which accumulates and stores the image signals formed by the image sensor, a printer which scans a medium such as copy paper to print an image thereon on the basis of the stored image in the memory, and a driver which causes both the image sensor and the printer to scan within a single plane. A film which is advantageously used in such an electronic image transfer device includes transparent areas and donor areas alternately formed along its length. The donor areas are coated with a donor material which melts at a predetermined temperature. One of the transparent areas is used when an image is scanned by the image sensor but a donor area is used when an image is printed. Since these areas are formed alternately on the film, the film can be moved in one direction to conveniently expose a correct area during each process. Doner films, or ink films, of conventional type are manufactured and sold, for example, by Fuji Kagaku Kami Kagyo, Inc. of Osaka, Japan.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 6 is a block diagram of a control unit for the device of FIGS. 3 and 4.

DETAILED DESCRIPTION OF THE INVENTION

Figure 1:
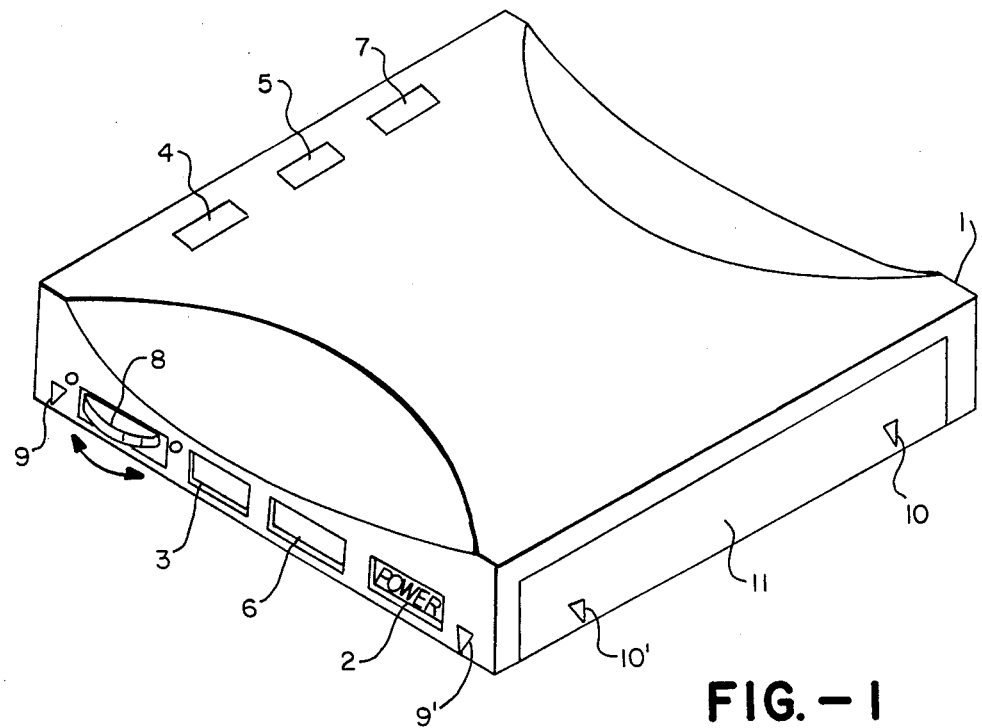
FIG. 1 is an external view of an electronic image transfer device embodying the present invention taken diagonally from above.
Figure 2:
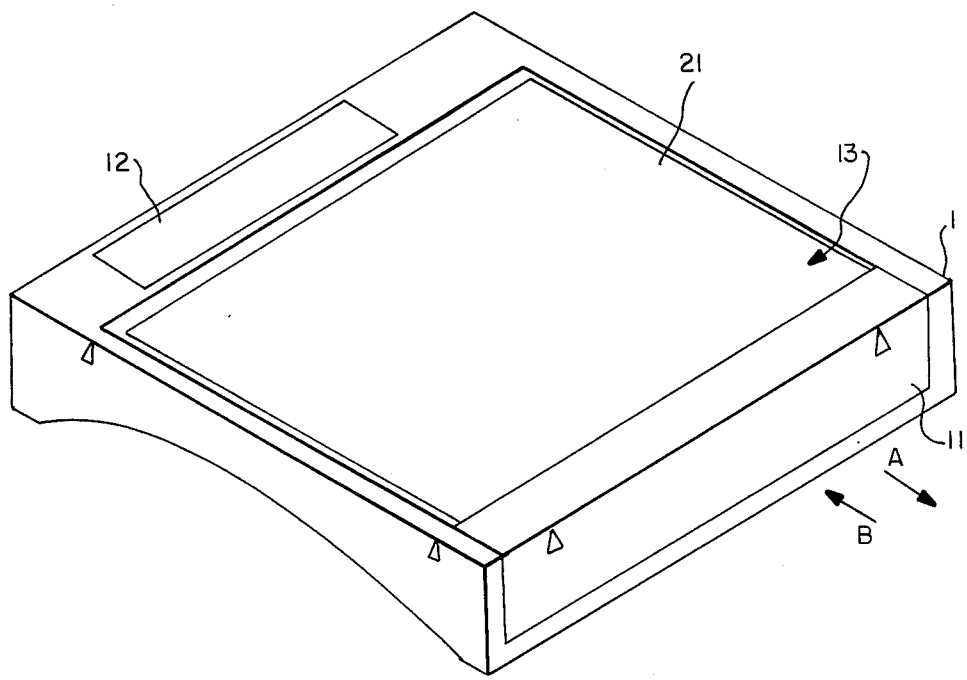
FIG. 2 is another external view of the electronic image transfer device of FIG. 1 taken diagonally from below.

FIGS. 1 and 2 are external views of an electronic image transfer device of the present invention, taken diagonally from above and below, respectively. Its housing 1 is approximately hexahedral and looks like a flat box. On a side surface of the housing 1, there are a power switch 2, a transfer switch 6, a read switch 3 and a contrast control 8. The power switch 2 is for switching on and off the power supply to the device. The read switch 3 is for starting the process of reading an original document. The transfer switch 6 is for starting the process of printing an image on a medium such as a sheet of copy paper. The contrast control 8 is for adjusting the darkness or lightness level of the image at the time of transfer.

The top surface of the housing 1 is provided with a "read" lamp 4, a "memory" lamp 5 and a "transfer" lamp 7. The "read" lamp 4 goes on when the read switch 3 is operated and remains lit while the reading continues. The "memory" lamp 5 remains lit while an image which has been read is stored in the memory. The "transfer" lamp 7 goes on when the transfer switch 6 is operated and remains lit throughout a transfer process.

The bottom surface of the housing 1 is openable and serves as input-output surface 13. The bottom surface is also provided with a removable cover 12 for a battery compartment. Batteries which are the power source of the device are replaced by removing this cover 12.

Indicators 9, 9', 10 and 10' on side surfaces of the housing 1 serve to indicate the range inside which an image can be read and printed. A cartridge 11, which contains a thermal transfer donor film 21 for forming an image in a transfer process, is exposed to the exterior on one of the side surfaces perpendicular and adjacent to the surface containing the power switch 2, etc. The cartridge 11 is mounted to the device along the arrow B and removed therefrom along the arrow A. Thus, the film 21 can be exchanged easily.

Figure 3:
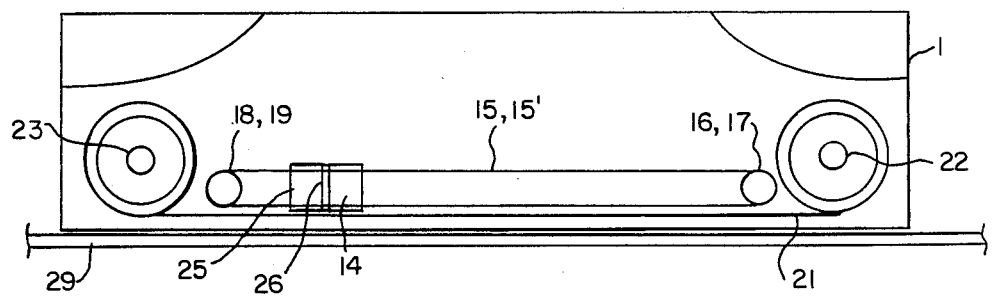
FIG. 3 is a sectional side view, showing the structure of the image transfer device of FIGS. 1 and 2.
Figure 4:
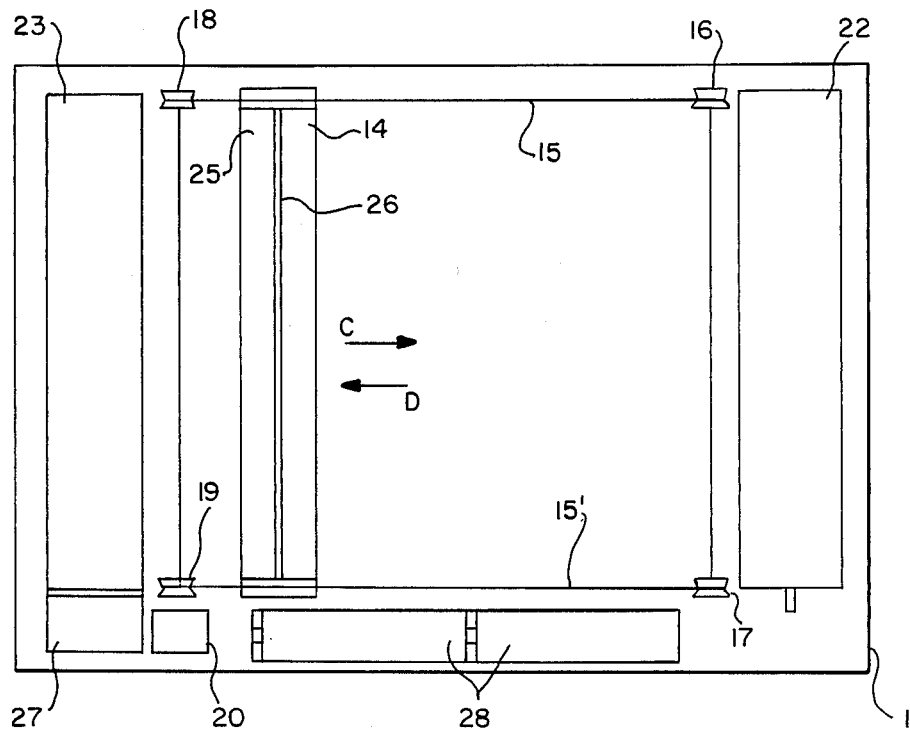
FIG. 4 is a sectional plan view of the image transfer device of FIG. 3, FIGS. 5A and 5B are a plan view and a side view of a thermal transfer donor film embodying the present invention.

FIG. 3 is a sectional side view to show the structure of the image transfer device described above. FIG. 4 is its sectional plan view. With reference to FIGS. 3 and 4, an image sensor 14 and a thermal head 25 are disposed inside the housing 1 near its bottom surface such that they can perform reciprocating motion in the directions of the arrows C and D by means of a wire 15 stretched between pulleys 16 and 18 and another wire 15' stretched between pulleys 17 and 19. The image sensor 14 and the thermal head 25 are formed as a single unit with a thermal insulator 26 inserted inbetween. The image sensor 14 is of a contact type and includes a charge-coupled image sensor which serves as light-receiving means, an LED array which serves as light-emitting means and a converging lens array. The light-receiving means may be formed alternatively by a phototransistor array. The thermal transfer donor film 21 is supported by film rollers 22 and 23 and is passed between an original document 29 to be copied and the scanning device composed of the image sensor 14 and the thermal head 25 such that the scanning device moves nearly in contact with the top surface of the thermal transfer donor film 21. A film motor 27 transmits its driving force to the film roller 23. The pulleys 18 and 19 are driven by a scanner motor 20. Thus, the scanner motor 20 serves as the driving means for the unistructurally constructed image sensor 14 and thermal head 25, moving them over an original when images are read and over a sheet of copy paper when images are printed. The scanner motor 20 and the film motor 27 are powered by batteries 28.

FIG. 5A is a plan view of the thermal transfer donor film 21 (hereinafter referred to simply as "film") which embodies the present invention and is a part of image printing means of the electronic image transfer device described above. FIG. 5B is its side view.

The film 21 is characterized as having transparent areas 31 and donor areas 32 alternately and continuously along its length. The width of each area is approximately the same as that of the input-output surface 13. Holes 3 are provided at equal intervals on both side edges of the film 21. The film rollers 22 and 23 are provided with protrusions (or sprockets) on their external peripheries. They engage with the holes 33 in the film 21 to accurately control the translational motion of the film 21.

The aforementioned electronic image transfer device has a control unit. With reference to FIG. 6 which is its block diagram, signals from the read switch 3, transfer switch 6 and power switch 2 on a side surface of the housing 1 are received by a central processing unit (CPU) 41 through an I/O interface 44. The degree of contrast selected by the contrast control 8 is received through another I/O interface 46. Signals representing an image detected by the image sensor 14 which scans the original 29 are converted by an analog-to-digital converter (A/D) 55 into digital signals and received by the CPU 41 through still another I/O interface 45. Programs to be performed in response to signals from these input means are stored in ROM 42 and read by the CPU 41 therefrom. The image detected by the image sensor 14 is stored in a memory area M1 inside RAM 43.

The CPU 41 transmits signals to drivers 51, 52 and 53 respectively through I/O interfaces 47, 48 and 49 to control the thermal head 25, the film motor 27 and the scanner motor 20. The CPU 41 also transmits signals through an I/O interface 50 to a driver 54 for turning on and off the "read" lamp 4, the "memory" lamp 5 and the "transfer" lamp 7. Signals transmitted to the driver 51 connected to the thermal head 25 correspond to the image stored in the memory area M1 of the RAM 43. Signals to the drivers 52 and 53 connected respectively to the film motor 27 and the scanner motor 20 are transmitted when the read switch 3 and the transfer switch 6 are turned on. Signals to the driver 54 connected to the "read" lamp 4, etc. are transmitted, depending on the input-output conditions. A signal to turn on the "read" lamp 4 is transmitted when the CPU 41 transmits a signal to the scanner motor 20 while receiving image signals from the image sensor 14. Signals for turning on the "transfer" lamp 7 are transmitted while signals for switching on the scanner motor 20 and the thermal head 25 are being transmitted. Signals for turning on the "memory" lamp 5 are transmitted while signals from the image sensor 14 are stored in the RAM 43.

Figure 7:
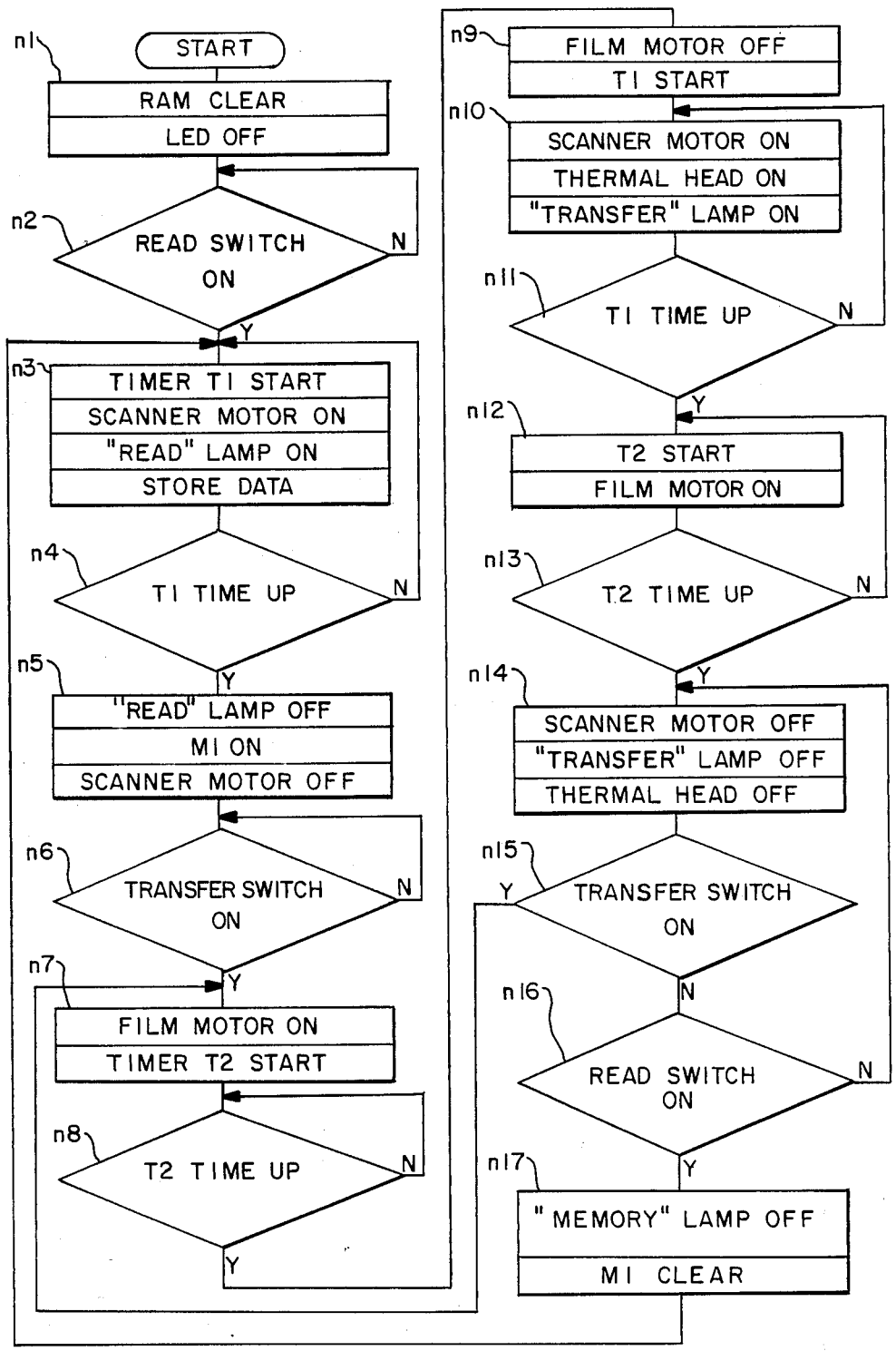
FIG. 7 is a flow chart for the operation of the device of FIGS. 3 and 4.

FIG. 7 is a flow chart which shows the operation of the electronic image transfer device described above. When the power switch 2 is turned on, the memory contents of the RAM 43 are cleared and all LEDs are turned off (n1). If the read switch is operated (n2) after this initialization step, a timer T1 is started, the scanner motor 20 is switched on and the "read" lamp 4 is turned on (n3). With the scanner motor 20 in motion, the image sensor 14 scans an original 29 and analog-to-digital converted image signals are received by the CPU 41. These image date are stored in the RAM 43 (n3). This operation continues until the timer T1 counts up a predetermined time period (n4). The timer T1 measures time as the scanning section composed of the image sensor 14 and the thermal head 25 completes its motion over the entire input-output surface 13.

When the timer T1 counts up the set time ("T1 TIME UP"), it is interpreted as the end of the scan, and the scanner motor 20 is turned off, the "read" lamp 4 is extinguished and the "memory" lamp 5 is turned on instead (n5). When the transfer switch 6 is operated thereafter (n6), the film motor 27 is switched on and the timer T2 is started. The timer T2 keeps track of the time until the film 21 is moved sufficiently by the film motor 27 such that a donor area 32 disappears and a transparent area 31 appears on the input-output surface 13.

When the timer T2 counts up the set time ("T2 TIME UP" at n8), the film motor 27 is switched off and the timer T1 is started again (n9). Thereafter, the scanner motor 20 and the thermal head 25 are driven according to the contents or the memory area M1 and the "transfer" lamp 7 is turned on (n10) until the timer T1 counts up the set time (n11). With the motion of the thermal head 25, the donor which covers the donor area 32 formed on the film 21 becomes transferred onto the surface of copy paper. After the timer T1 counts up its set time (n11), the timer T2 is started and the film motor 27 is switched on (n12). This operation of the film motor 27 is continued until the timer T2 counts up its set time (n13) such that the film 21 is always moved after the completion of a transfer process to be ready for the next reading.

When the timer T2 counts up its set time (n13), the scanner motor 20, the thermal head 25 and the "transfer" lamp 7 are all switched off (n14). Thereafter, it is checked whether the transfer switch 6 has been operated or not (n15). If it has not been operated, it is checked next whether the read switch 3 has been operated or not (n16). If the transfer switch 6 is found to have been operated in Step n15, the series of transfer operation steps (n7-n13) is repeated. If it is found in Step n16 that the read switch 3 has been operated, the "memory" lamp 5 is turned off, the memory area M1 in the RAM 43 is cleared (n17) and the program returns to Step n3 to repeat the reading process (n3-n5). If it is found in Step n16 that the read switch 3 has not been operated, the program returns to Step n14 and the operations n14-n15-n16-n14 are repeated. In other words, the control unit repeats these processes if neither the read switch 3 nor the transfer switch 6 is operated while the power switch 2 is in the ON condition and waits for either the transfer switch 6 or the read switch 3 to be operated.

In summary, the scanner motor 20 causes the image sensor 14 to scan an original document 29 and the signals indicative of the image on the document to be copied are stored in the memory area M1. During this process, a transparent area 31 of the film 21 is between the image sensor 14 and the document 29.

Next, when transfer is specified, the film 21 is advanced until a donor area 32 lies on the input-output surface 13 and the scanner motor 20 causes the thermal heads 25 to move over the copy paper. During this process, the CPU 41 transmits signals corresponding to the image stored in the memory area M1. The donor on the surface of the film 21 is thereby transferred thermally and an image is formed on the copy paper. As long as the image signals formed by the image sensor 14 remain stored in the memory area M1, any number of transferred images can be formed by operating the transfer switch 6 repeatedly.

The foregoing description of a preferred embodiment of the invention has been presented for purposes of illustration and description. It is not intended to be exhaustive or to limit the invention to the precise form disclosed, and many modifications and variations are possible in light of the above teaching. For example, the scanning mode need not necessarily be designed as described above. According to the embodiment described above, the image sensor 14 and the thermal head 25 complete a scan by moving in one direction only from one end of the input-output surface 13 to the other side such that the starting position of scan changes each time and hence that the image stored in the memory area M1 is read in alternately reverse directions in the transfer process. The scan mode may be designed alternatively such that each scan involves a reciprocating motion and hence that the starting position of scan is always on the same side of the input-output surface 13. The timers T1 and T2 may be made to function either by counting the number of motor pulses or the number of holes in the film which pass. Moreover, transfer of images may be made possible also onto media other than copy paper such as a film, cloth, a wooden plate, a wall, etc. Any such modifications and variations which may be apparent to a person skilled in the art are intended to be included within the scope of this invention.

What is claimed is:

1. An electronic image transfer device comprising
   an image sensor which scans an original to form image signals,
   a memory means which accumulates and stores said image signals,
   a printing means which scans a medium at a scan position and prints an output image on said medium according to said image signals stored in said memory means, and
   driving means for causing said image sensor and said printing means to scan substantially same areas within a same plane.

2. The device of claim 1 wherein said printing means includes a thermal head and said image sensor and said thermal head are unistructurally formed.

3. The device of claim 2 wherein said image sensor and said thermal head are elongated and positioned mutually parallel to each other.

4. The device of claim 3 wherein said image sensor and said thermal head are disposed perpendicularly to the direction of scan by said driving means.

5. The device of claim 2 further comprising a thermal insulator disposed between said thermal head and said image sensor.

6. The device of claim 1 wherein said medium includes an elongated thermal transfer donor film having transparent areas and donor areas formed alternately lengthwise, said donor areas having donor coating which melts at a specific temperature, said device operating such that said image sensor scans an original when one of said transparent areas is at said scan position and that said printing means prints an output image when one of said donor areas is at said scan position.

7. The device of claim 6 wherein said donor film has series of holes longitudinally formed along edges thereof.

8. The device of claim 1 wherein said driving means include a single driver which causes said image sensor and said printing means to scan substantially same areas within said same plane.

* * * * *